United States Patent
Boroditsky et al.

(10) Patent No.: US 6,871,020 B1
(45) Date of Patent: Mar. 22, 2005

(54) POWER SPECTRUM MONITORING AND MANAGEMENT IN A WAVELENGTH DIVISION MULTIPLEXED NETWORK

(75) Inventors: Mikhail Boroditsky, Middletown, NJ (US); Nicholas J. Frigo, Red Bank, NJ (US); Cedric F. Lam, Middletown, NJ (US)

(73) Assignee: AT&T Corp., Bedminster, NJ (US)

( * ) Notice: Subject to any disclaimer, the term of this patent is extended or adjusted under 35 U.S.C. 154(b) by 555 days.

(21) Appl. No.: 09/825,019

(22) Filed: Apr. 3, 2001

(51) Int. Cl.$^7$ ................................................ H04J 14/02
(52) U.S. Cl. ............................................ 398/38; 398/9
(58) Field of Search ........................... 398/9, 94, 83, 398/33, 34, 1

(56) References Cited

U.S. PATENT DOCUMENTS

| | | | | |
|---|---|---|---|---|
| 5,959,749 A | * | 9/1999 | Danagher et al. | 398/83 |
| 6,040,933 A | * | 3/2000 | Khaleghi et al. | 398/1 |
| 6,208,441 B1 | * | 3/2001 | Jones et al. | 398/87 |
| 6,212,001 B1 | * | 4/2001 | Bode et al. | 359/337.1 |
| 6,219,162 B1 | * | 4/2001 | Barnard et al. | 398/9 |
| 6,351,323 B1 | * | 2/2002 | Onaka et al. | 398/84 |
| 2002/0021861 A1 | * | 2/2002 | Gnauck et al. | 385/24 |

OTHER PUBLICATIONS

C. Guillemot et al, "Transparent Optical Packet Switching: The European ACTS KEOPS Project Approach," *Journal of Lightwave Technology*, vol. 16, No. 2, Dec. 1998, pp. 2117–2134.

J. O. Mahony et al., "The Design of a European Optical Network," *Journal of Lightwave Technology*, vol. 13, No. 5, May 1995, pp. 817–828.

* cited by examiner

*Primary Examiner*—Leslie Pascal
*Assistant Examiner*—David C. Payne (57) ABSTRACT

A power spectrum measurement system and a method monitor a power spectrum of N-channels in an M-channel wavelength division multiplexed optical communication network, where N is less than or equal to M. An add-drop node in the network drops a channel and adds a channel for transmitting data on the network. The added channel has the same wavelength as the dropped channel. The power of the added channel is controlled to minimize crosstalk. The power spectrum measurement system includes a detection circuit and a processing circuit. The detection circuit is an inexpensive, scalable circuit for detecting the power of each channel. The processing circuit is connected to the detection circuit and calculates the power of each channel based upon the power detected by the detection circuit. The processing circuit also calculates power of the added channel for minimizing crosstalk. The calculated power of the added channel is a function of the powers measured for the N-channels, including but not limited to the average power of the N-channels or the powers of the channels adjacent the added channel. The calculated power is transmitted to the node adding the channel for controlling the power of the added channel.

3 Claims, 6 Drawing Sheets

POWER SPECTRUM MONITORING AND MANAGEMENT IN A WAVELENGTH DIVISION MULTIPLEXED NETWORK

FIELD OF THE INVENTION

The present invention relates to an optical power spectrum measurement system and method for monitoring and controlling a power spectrum in a wavelength division multiplexed optical communication network. More specifically, the present invention relates to an optical power spectrum measurement system that reduces crosstalk by measuring the power of a plurality of channels in a wavelength division multiplexed optical communication network and by controlling the optimal power of a channel added by a node in the network.

BACKGROUND OF THE INVENTION

Fiber optics have had a large impact on transmission techniques, due in part to the large bandwidth and high data rate capability of fiber optics. Wavelength division multiplexed (WDM) networks employ a transmission technique that allows multiple wavelengths (i.e., channels) to be transmitted on a single fiber and further increases the bandwidth of an optical network.

It is highly desirable to maintain constant optical power in all channels in order to minimize inter-channel crosstalk. Crosstalk occurs in an optical transmission system when separate WDM channels interfere with one another due to inadequate channel protection or unequal power levels between adjacent channels. Crosstalk results in undesirable noise in a given channel as a result of optical signal leaking from other channels. As the number of channels carrying signals for WDM transmissions increases, the impact of crosstalk between adjacent channels and other WDM channels also increases. Crosstalk should be minimized to receive a better signal-to-noise ratio on the receiving end of an optical transmission on a WDM channel. O'Mahony et al., in an article entitled "The Design of a European Optical Network," discloses design issues for a large-scale WDM network traversing Europe and identifies crosstalk as a design issue that must be considered.

Power spectrum monitoring and management is critical for amplified, add-drop, WDM networks, because power fluctuations caused by added or dropped channels can create crosstalk. Conventional power monitoring techniques employ spectrometers or wavelength division demultiplexors for monitoring the power of channels in a WDM network. These techniques are complex, costly to implement, not readily scalable and do not include techniques for mitigating crosstalk. Consequently, a need exists for providing a low-cost, scalable power monitoring system that can be used to mitigate crosstalk.

SUMMARY OF THE INVENTION

In view of the foregoing, it is an aspect of the present invention to provide an apparatus and method for controlling inter-channel crosstalk in a WDM network.

According to the aspect of the present invention, a power spectrum measurement system is provided that is connected to an add-drop node in an M-channel WDM optical communication network, where M is the number of channels multiplexed on a single fiber in the network.

The power spectrum measurement system includes a power detection circuit detecting the power for N channels in the M-channel WDM network and a processing circuit for calculating the power of the N channels and controlling the power of a channel added at the add-drop node to minimize crosstalk. The number of channels N can be less than or equal to M.

The power detection circuit includes N/2 optical splitters, N−1 filters and N power detectors. The filters can include Bragg grating fibers. The power detectors can include photodetectors, and the optical splitters can include couplers.

The processing circuit calculates the power for N channels in the network and transmits a feedback signal to the node for calculating the optimal power of the channel added by the node. The calculated power of the added channel is based on $P^{j+1}{}_k = F(P^j{}_\forall)$. $P^{j+1}{}_k$ is the power of the added channel at wavelength k, and $P^j{}_\forall$ are the powers of the channels in the span j. The span j includes fiber carrying the channels to the node adding channel k. The parameters of function F depend on the network and physical origin of the crosstalk. Several embodiments of function F are described below.

In one preferred embodiment of the present invention, the calculated power of the added channel is approximately equal to $(1-2d)P^j{}_k + d(P^j{}_{k-1} + P^j{}_{k+1})$. $P^j{}_k$ is the power of a channel in span j that has the same wavelength k as the added channel, and $P^j{}_{k-1}$ and $P^j{}_{k+1}$ are the powers of channels in the span j that are adjacent $P^j{}_k$. Parameter d is a diffusion parameter having a value less than or equal to 0.5 and greater than or equal to 0.

In another preferred embodiment of the present invention, the calculated power of the added channel is approximately equal to the average power of the channels in the network, not including the power of the added channel. Either embodiment may be used for mitigating crosstalk, depending, for example, on the physical origin of the crosstalk.

A method is also provided for monitoring and controlling a power spectrum of an M-channel WDM optical communication network. The method includes detecting power for N channels in the M-channel network; calculating power for the N channels; and controlling power of a channel added by a node in the network. Power detection and calculations can be performed by the detection circuit and processing circuit.

The power management system of the present invention provides a low-cost, scalable system for minimizing transmission impairments that can be readily implemented on a variety of platforms. Transmission impairments include, but are not limited to, inter-channel crosstalk and same-channel crosstalk (e.g., crosstalk between added and dropped channels). Also, because of the system's versatility and low cost, the system can be implemented for each node in a WDM network.

Other features and advantages of the present invention will become apparent with reference to the following detailed description and figures.

BRIEF DESCRIPTION OF THE DRAWINGS

The present invention is illustrated by way of example and not limitation in the accompanying figures in which like reference numerals indicate similar elements and in which.

DETAILED DESCRIPTION OF THE PREFERRED EMBODIMENT

Figure 1:
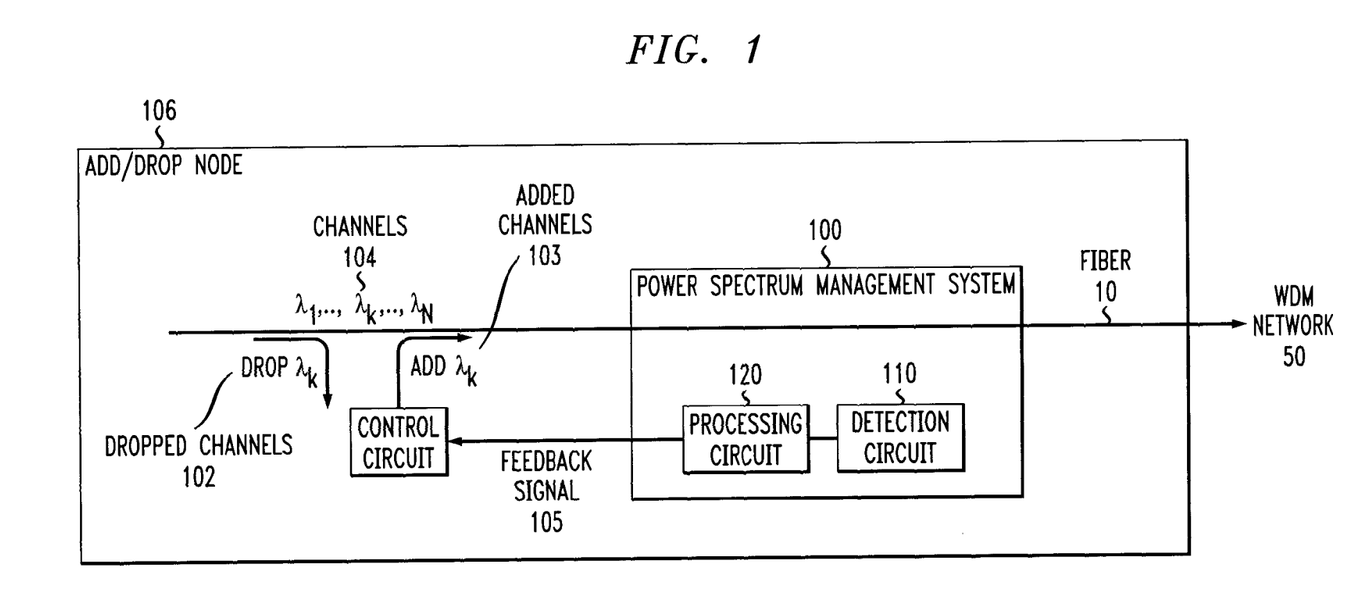
FIG. 1 is a schematic block-diagram of a power management system according to the present invention connected to an add-drop node.

FIG. 1 illustrates power spectrum management system 100 according to a preferred embodiment of the present invention that monitors power for N channels in an M-channel WDM network 50 and creates feedback signal 105 for adjusting the power of added channel 103. M-channel WDM network 50 includes M number of channels multiplexed on fiber 10, and the number of monitored channels N can be less than or equal to the number of multiplexed channels M. Added channel 103 includes a channel added to fiber 10 (i.e., a channel multiplexed on fiber 10) by add/drop node 106.

System 100 includes detection circuit 110 for detecting power for channels 104 (i.e., N channels) and processing circuit 120 for calculating the power for channels 104 carried on fiber 10 in WDM network 50. Channels 104 that include added channel 103, are carrier wavelengths $\lambda_1-\lambda_N$ having powers $P_1-P_N$ respectively. Power is the signal power for each of channels 104.

Processing circuit 120 creates feedback signal 105, and control circuit 125 in add-drop node 106 controls the power of added channel 103 for minimizing crosstalk based upon feedback signal 105. Processing circuit 120 can include a processor or conventional processing circuitry. Control circuit 125 can include conventional processing circuitry for controlling power of an added channel.

System 100 can be located at an add-drop node, such as add-drop node 106 in WDM network 50, or at a remote monitoring station located anywhere in WDM network 50 that fiber 10 can be tapped for obtaining a power spectrum measurement. For purposes of illustrating an exemplary embodiment of system 100, FIG. 1 illustrates system 100 located in add-drop node 106.

As shown in FIG. 1, add-drop node 106 can add or drop channels (e.g. drop channel 102 and add channel 103, channel 102 and channel 103 generally have the same wavelength.). The power of added channel 103 and channels adjacent to channel 103 should be approximately equal for minimizing crosstalk. Consequently, the power for channels 104 must be determined for controlling the power for added channel 103 to minimize crosstalk.

In a preferred embodiment of the present invention, system 100 includes detection circuit 110 having N/2 optical splitters, N−1 filters/reflectors and N power detectors (N equals the number of channels in WDM network 50). Detection circuit 110 provides an inexpensive, scalable technique for detecting the power of channels 104.

Figure 2:
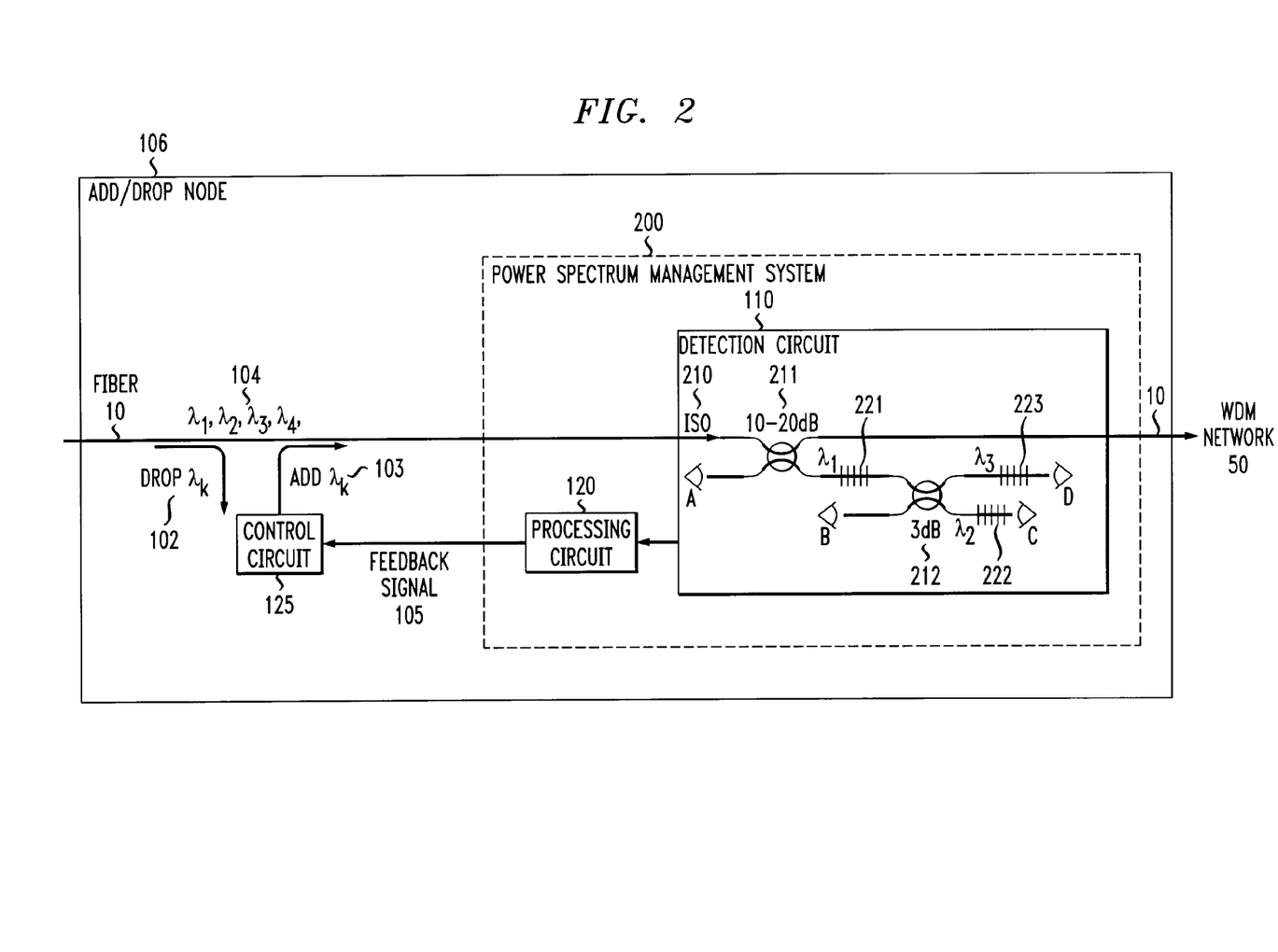
FIG. 2 is a schematic block-diagram of a preferred embodiment of the power management system connected to an add-drop node and scaled for a four-channel WDM network.

FIG. 2 illustrates power spectrum management system 200 that is scaled for a four-channel WDM network 50 (i.e., power is detected and calculated for four channels multiplexed on fiber 10 and the power of an added channel is controlled based on the detected and calculated power) and that employs the principles of system 100, shown in FIG. 1.

System 200 includes scalable, detection circuit 110 operative to detect power for four channels 104 at wavelengths $\lambda_1-\lambda_4$. Channels 104 have power $P_1-P_4$ respectively.

Channel 102 at wavelength $\lambda_k$ is dropped and channel 103 is added (e.g., for transmitting data from node 106) at the same wavelength $\lambda_k$ ($\lambda_k$ can include any of channels at $\lambda_1-\lambda_4$). Detection circuit 110 detects the powers of channels 104 and processing circuit 120 calculates the power of channels 104.

Detection circuit 110, shown in FIG. 2, taps a fraction of an optical signal consisting of channels 104 using 10 or 20 dB coupler 211, resulting in a 0.5 dB or less power loss for the tapped signal. A split-off signal passes through Bragg fiber reflector 221, having a narrow-band reflection filter for $\lambda_1$. Bragg fiber gratings are special fibers, represented as (-||||-) in FIG. 2, that reflect light back at a specified wavelength (e.g., $\lambda_1$) and transmit light at all other wavelengths. After the split-off signal is reflected by grating 221, nearly all of the split-off signal goes into photodetector A for detecting $P_1$. Wavelengths $\lambda_2$, $\lambda_3$, $\lambda_4$ are then split by 3 dB coupler 212. One branch connected to coupler 212 includes grating 222 reflecting at $\lambda_2$, and another branch includes grating 223 reflecting at $\lambda_3$. Photodetector C detects half of the power at wavelengths $\lambda_3$ and $\lambda_4$, while photodetector D detects half of the power at $\lambda_2$ and $\lambda_4$. Photodetector B detects a quarter of the power at $\lambda_2$ and $\lambda_3$ reflected by gratings 222 and 223. Another quarter of the power at $\lambda_2$ and $\lambda_3$ reflects to port A. Optical isolator 210 can be placed before the tap for preventing reflection back towards fiber 10.

Processing circuit 120 is connected to photodetectors A–D that receive light and detect power at wavelengths $\lambda_1-\lambda_4$. Processing circuit 120 calculates powers $P_1-P_4$ based upon the following linear equations, which represent the power detected at each photodetector A–D:

$$A=P_1+¼(P_2+P_3)$$

$$B=¼(P_2+P_3)$$

$$C=½(P_3+P_4)$$

$$D=½(P_2+P_4)$$

The above linear equations for calculating unknown powers $P_i$, i=1, . . . 4 can be easily solved, as shown below.

$$P_1=A-B$$

$$P_2=2B-C+D$$

$$P_3=2B+C-D$$

$$P_4=-2B+C+D$$

Because there is no optical power loss in this situation, $P_1+P_2+P_3+P_4=A+B+C+D$. Also, gratings 221, 222 and 223 reflect light at different wavelengths, which results in negligible resonant interference in the power measurements.

Figure 3:
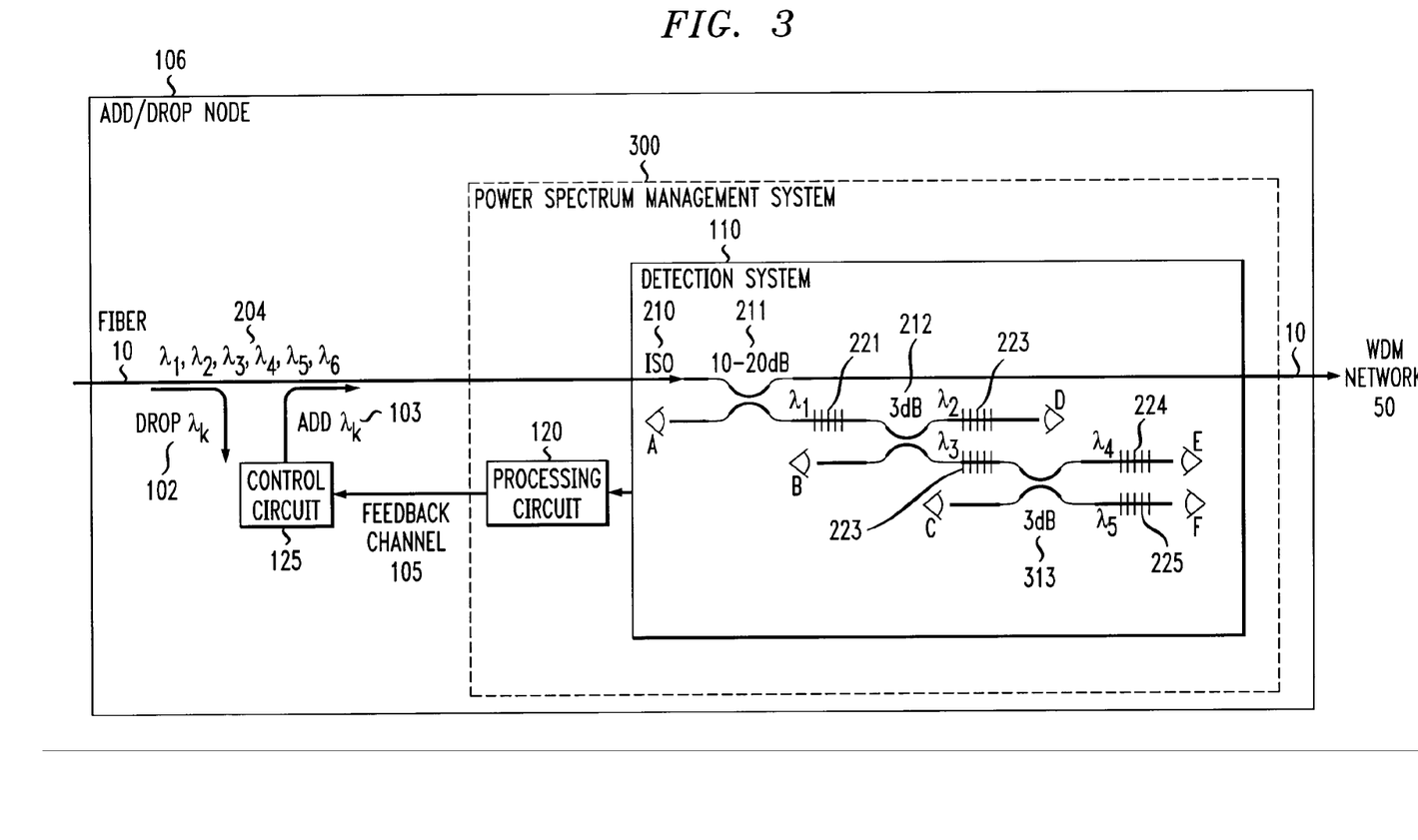
FIG. 3 is a schematic block-diagram of the preferred embodiment of the power management system connected to an add-drop node and scaled for a six-channel WDM network.

FIG. 3 illustrates power spectrum management system 300 that is scaled for six-channel WDM network 50 and that employs the principles of system 100, shown in FIG. 1. $P_1-P_6$ are the powers of channels 204 at wavelengths $\lambda_1-\lambda_6$.

Detection circuit 110 detects power for six channels 204 and includes three optical splitters (i.e., 10–20 dB coupler 211, 3 db coupler 212 and 3 dB coupler 313), five gratings 221–225 reflecting light at wavelengths $\lambda_1-\lambda_5$ respectively and six photodetectors A–F.

Processing circuit 120 is connected to photodetectors A–F that receive light and detect power at wavelengths $\lambda_1-\lambda_6$.

Processing circuit 120 calculates powers $P_1$–$P_6$ based upon the following linear equations, which represent the power detected at each photodetector A–F:

$$A = P_1 + \tfrac{1}{4}P_2 + \tfrac{1}{4}P_3 + \tfrac{1}{16}P_4 + \tfrac{1}{16}P_5 + 0$$

$$B = 0 + \tfrac{1}{4}P_2 + \tfrac{1}{4}P_3 + \tfrac{1}{16}P_4 + \tfrac{1}{16}P_5 + 0$$

$$C = 0 + 0 + 0 + \tfrac{1}{8}P_4 + \tfrac{1}{8}P_5 + 0$$

$$D = 0 + 0 + \tfrac{1}{2}P_3 + \tfrac{1}{2}P_4 + \tfrac{1}{2}P_5 + \tfrac{1}{2}P_6$$

$$E = 0 + \tfrac{1}{4}P_2 + 0 + 0 + \tfrac{1}{4}P_5 + \tfrac{1}{4}P_6$$

$$F = 0 + \tfrac{1}{4}P_2 + 0 + \tfrac{1}{4}P_4 + 0 + \tfrac{1}{4}P_6$$

The above linear equations for calculating unknown powers $P_i$, i=1, ... 6 can be easily solved, as shown below.

$$P_1 = A - B$$

$$P_2 = 2B + C - D + E + F$$

$$P_3 = 2B - 3C + D - E - F$$

$$P_4 = 4C - 2E + 2F$$

$$P_5 = 4C + 2E - 2F$$

$$\text{i } P_6 = -2B - 5C + D + E + F$$

Figure 4:
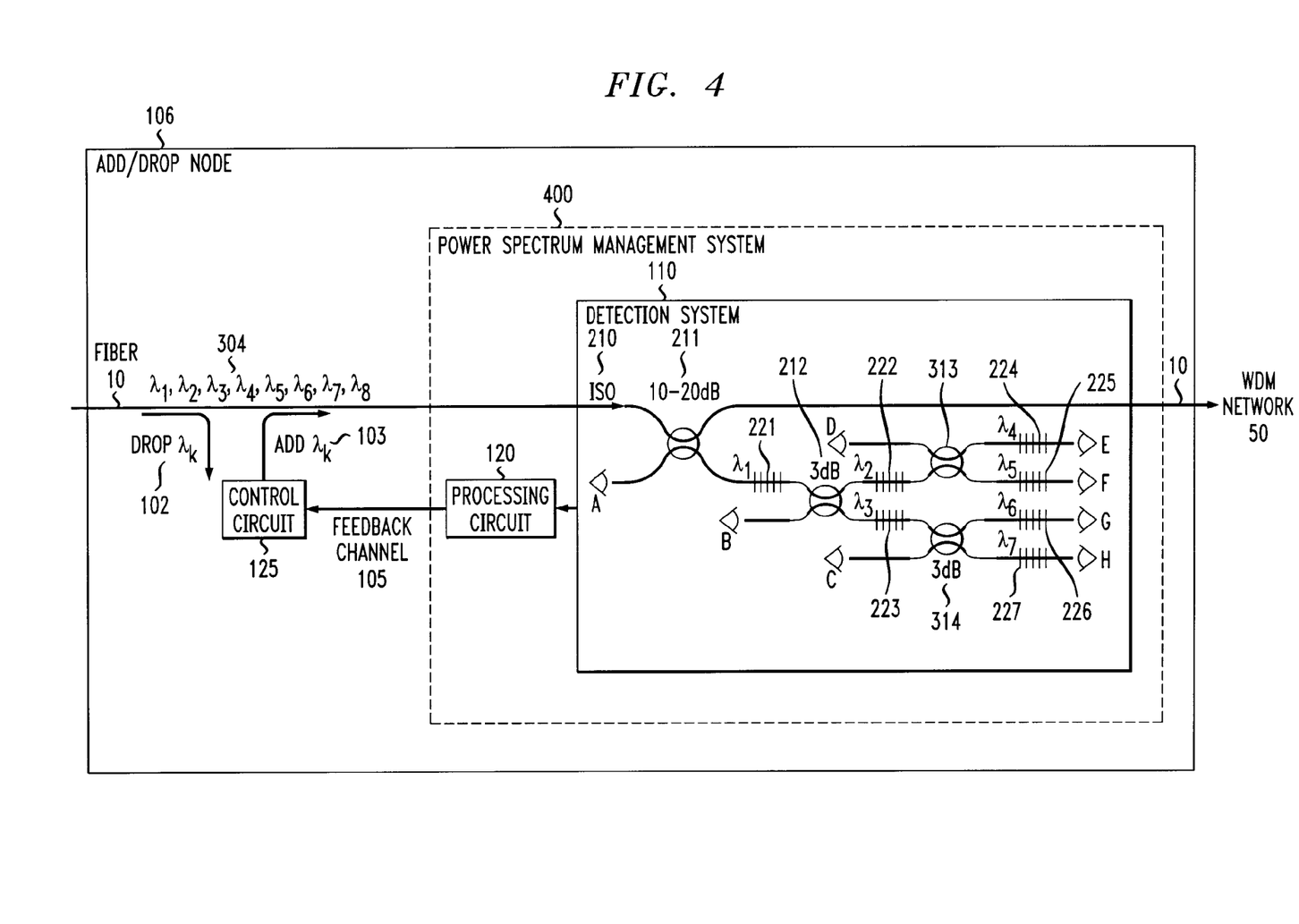
FIG. 4 is a schematic block-diagram of the preferred embodiment of the power management system connected to an add-drop node and scaled for an eight-channel WDM network.

In the same way, by adding another 3 dB coupler 314 and two more gratings 226 and 227, as shown in FIG. 4, system 400 is scaled for eight channels 104 carried on fiber 10. $P_1$–$P_8$ are the powers of channels 304 at wavelengths $\lambda_1$–$\lambda_8$.

Processing circuit 120 is connected to photodetectors A–H that receive light and detect power at wavelengths $\lambda_1$–$\lambda_8$. Processing circuit 120 calculates powers $P_1$–$P_8$ based upon the following linear equations, which represent the power detected at each photodetector A–H:

$$A = P_1 + \tfrac{1}{4}P_2 + \tfrac{1}{4}P_3 + \tfrac{1}{16}P_4 + \tfrac{1}{16}P_5 + \tfrac{1}{16}P_6 + \tfrac{1}{16}P_7 + 0$$

$$B = 0 + \tfrac{1}{4}P_2 + \tfrac{1}{4}P_3 + \tfrac{1}{16}P_4 + \tfrac{1}{16}P_5 + \tfrac{1}{16}P_6 + \tfrac{1}{16}P_7 + 0$$

$$C = 0 + 0 + 0 + 0 + 0 + \tfrac{1}{8}P_6 + \tfrac{1}{8}P_7 + 0$$

$$D = 0 + 0 + 0 + \tfrac{1}{8}P_4 + \tfrac{1}{8}P_5 + 0 + 0 + 0$$

$$E = 0 + 0 + \tfrac{1}{4}P_3 + 0 + \tfrac{1}{4}P_5 + \tfrac{1}{4}P_6 + \tfrac{1}{4}P_7 + \tfrac{1}{4}P_8$$

$$F = 0 + 0 + \tfrac{1}{4}P_3 + \tfrac{1}{4}P_4 + 0 + \tfrac{1}{4}P_6 + \tfrac{1}{4}P_7 + \tfrac{1}{4}P_8$$

$$G = 0 + \tfrac{1}{4}P_2 + 0 + \tfrac{1}{4}P_4 + \tfrac{1}{4}P_5 + 0 + \tfrac{1}{4}P_7 + \tfrac{1}{4}P_8$$

$$H = 0 + \tfrac{1}{4}P_2 + 0 + \tfrac{1}{4}P_4 + \tfrac{1}{4}P_5 + 0 + \tfrac{1}{4}P_6 + 0 + \tfrac{1}{4}P_8$$

The above linear equations for calculating unknown powers $P_i$, i=1, ... 8 can be easily solved, as shown below.

$$P_1 = A - B$$

$$P_2 = 2B + C - 3D - E - F + G + H$$

$$P_3 = 2B - 3C + D + E + F - G - H$$

$$P_4 = 4D - 2E + 2F$$

$$P_5 = 4D + 2E - 2F$$

$$P_6 = 4C - 2G + 2H$$

$$P_7 = 4C + 2G - 2H$$

$$P_8 = -2B - 5C - 5D + E + F + G + H$$

Figure 5:
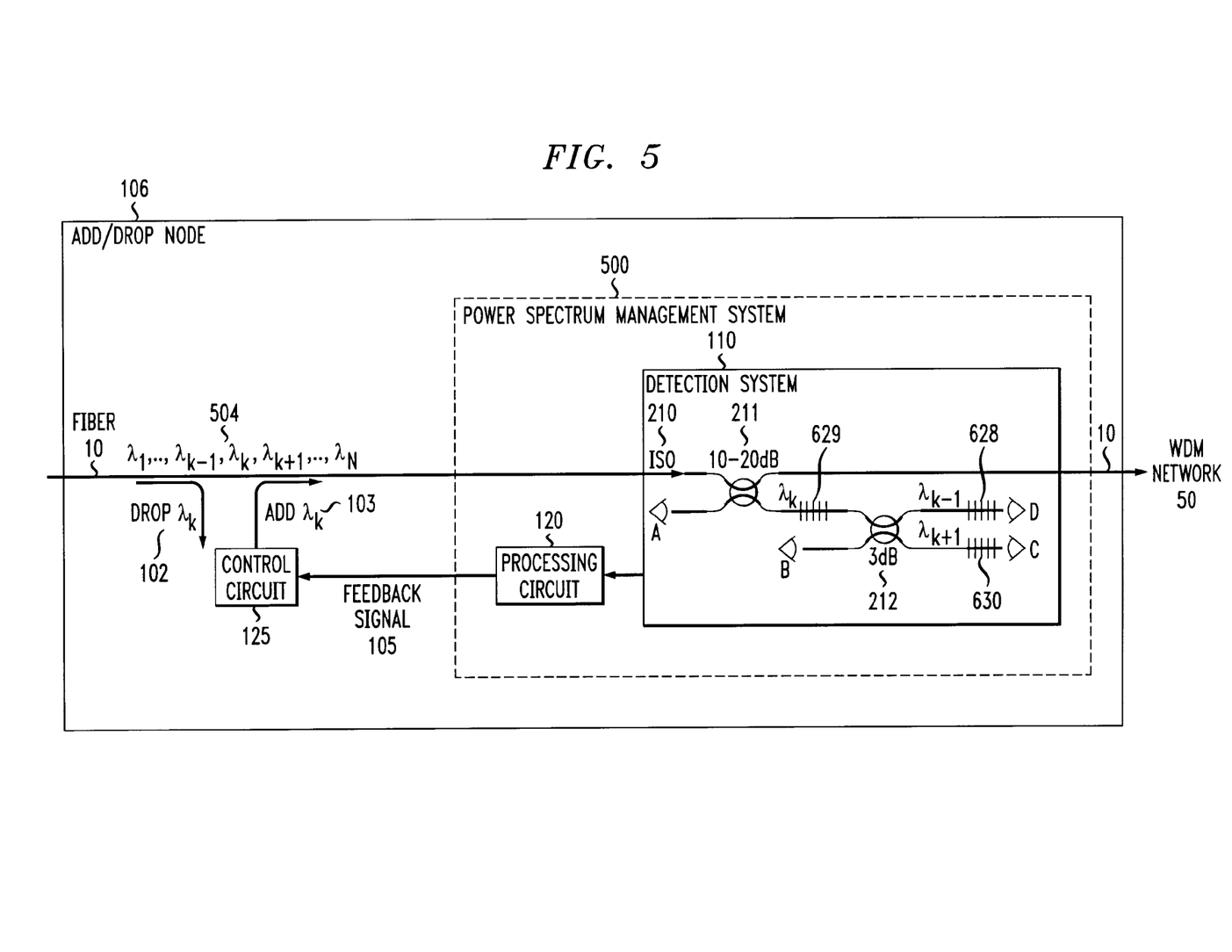
FIG. 5 is a schematic block-diagram of another preferred embodiment of a power management system connected to an add-drop node in an M-channel WDM network.

In another preferred embodiment of the present invention, when the powers of added channel $\lambda_k$ and adjacent channels $\lambda_{k-1}$ and $\lambda_{k+1}$ are needed to control feedback signal 105, system 500, shown in FIG. 5, can be used to detect power for N channels in M-channel WDM network 50, where N is less than or equal to M. Adjacent channels include the channels directly adjacent the added channel. For example, power is measured for N channels (e.g., 1 ... $\lambda_{k-1}, \lambda_k, \lambda_{k+1}$ ... N) on fiber 10. The channels adjacent added channel $\lambda_k$ include the wavelength ($\lambda_{k-1}$) below the added channel and the wavelength ($\lambda_{k+1}$) above the added channel.

Detection circuit 110 in system 500, shown in FIG. 5, is identical to detection circuit 110 in system 200, shown in FIG. 2, except detection circuit 110 in system 500 can be modified to detect power when more than four channels are wavelength division multiplexed on fiber 10. Generally, when a WDM network is designed, the wavelength of the channels added and dropped at each node in the WDM network is predetermined. Therefore, gratings 628–630 at each node in WDM network 50 can be changed to reflect wavelengths of added channel $\lambda_k$ and adjacent channels $\lambda_{k-1}$ and $\lambda_{k+1}$. For a WDM network that can be reconfigured, system 500 can be implemented using, for example, tunable fiber Bragg gratings. Consequently, the power of the adjacent channels $\lambda_{k-1}$ and $\lambda_{k+1}$ and the added channel $\lambda_k$ can be calculated based upon the following linear combination, where $\overline{P}$ denotes the total optical power in the remaining N−3 channels:

$$P_k = A - B$$

$$P_{k+1} = 2B - C + D$$

$$P_{k-1} = 2B + C - D$$

$$\overline{P} = -2B + C + D$$

As described above, after calculating power for each channel on fiber 10, processing circuit 120 transmits feedback signal 105 to control circuit 125 for controlling the power of added channel 103 to minimize crosstalk. Feedback signal 105, in any of systems 100–500, can include a signal transmitting the power for added channel 103 that is calculated by processing circuit 120.

FIGS. 2–4 illustrate exemplary power spectrum management systems scaled for 4, 6 and 8 channels. It should be understood that power spectrum management system 100, shown in FIG. 1, is readily scalable for less than 4 or more than 8 channels multiplexed in a WDM network.

Detection circuits 110, shown in FIGS. 2–5 and described above, include couplers, Bragg grating filters, and photodetectors. However, one of ordinary skill in the art would readily recognize that other known optical splitters, reflectors/filters, and power detectors can be used in the preferred embodiments described above.

Processing circuit 120 in any of systems 100–500 calculates the power of N channels in M-channel WDM network 50 and can calculate the power of added channel 103 for minimizing crosstalk. N is generally equal to M. However, N can be less than M, for example, when a service provider is responsible for a limited number of channels N carried on fiber 10 or if only the channels adjacent the added/dropped channel are monitored.

Figure 6:
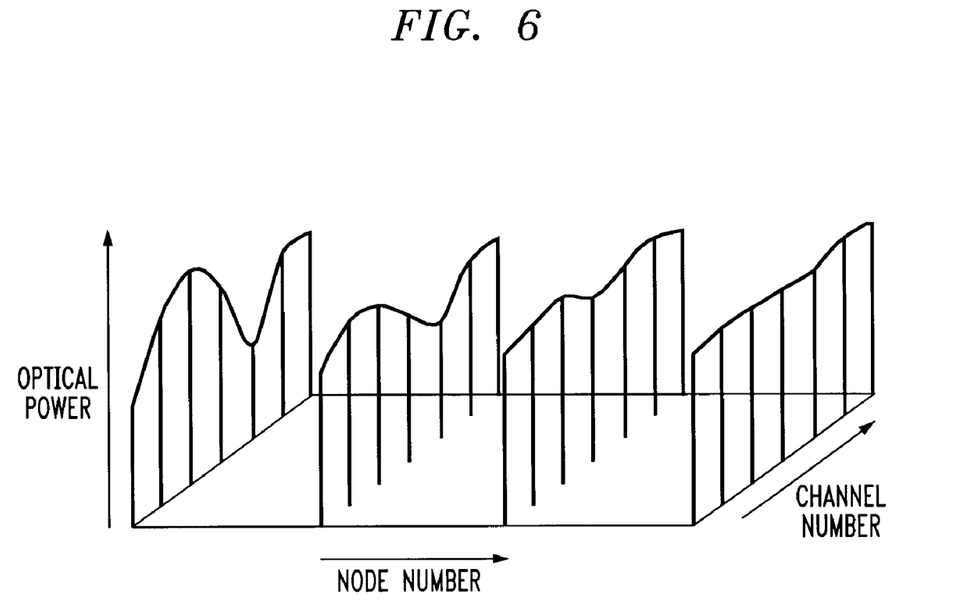
FIG. 6 is a plot of power distribution for a plurality of channels traversing a plurality of nodes in a WDM network.

In another preferred embodiment of the present invention, diffusive smoothing is used for calculating the optimal power for added channel 103. FIG. 6 illustrates an evolution of power for a plurality of channels in a WDM network. As signals carried by the channels traverse multiple add-drop nodes in the WDM network, the power levels diffuse across all the channels until the power distribution is smoothed out.

The calculated power of the added channel is based on $P^{j+1}_k = F(P^j_\forall)$. $P^{j+1}_k$ is the power of the added channel at wavelength k, and $P^j_V$ are the powers of the channels in span j. Span j includes fiber 10 carrying the channels to node 106, which adds a channel at wavelength k. The parameters of function F depend on the network and physical origin of the crosstalk. Embodiments of function F are described below.

Processing circuit 120 can use the following equation, based upon diffusive smoothing, for calculating the power of added channel 103 to minimize crosstalk:

$$P_k^{j+1} = (1-2d)P_k^j + d(P_{k-1}^j + P_{k+1}^j).$$

$P^{j+1}_k$ is the power of added channel 103, as calculated by processing circuit 120 and adjusted by processing circuit 120, in add-drop node 106. $P^j_k$ is the power of a channel in span j (e.g., dropped channel 102) that has the same wavelength k as added channel 103, and $P^j_{k-1}$ and $P^j_{k+1}$ are the powers of channels in the span j that are adjacent $P^j_k$. Parameter d is a diffusion parameter having a value less than or equal to 0.5 and greater than or equal to 0. $P^j_k$, $P^j_{k-1}$ and $P^j_{k+1}$ can be measured/calculated, for example, by detection circuit 110 and/or processing circuit 120 in any of systems 100–500.

Regarding parameter d, it takes approximately 2/d add-drops to smooth out any significant power difference between two adjacent channels in fiber 10. Therefore, by this equation it is shown that the power ($P^{j+1}_k$) of added channel 103 at add-drop node 106 is calculated based on the power of the added channel and adjacent channels at previously traversed nodes.

Parameter d can be preset for optimizing power spectrum distortion for a specific WDM network. At a maximum allowed value (i.e., d=0.5), $P^{j+1}_k$ is the average power of adjacent channels. In the intermediate case (i.e., d<0.5), $P^{j+1}_k$ is based upon the power of channels carried in spans connected to previously traversed nodes and calculated, for example, at previously traversed nodes. This prevents abrupt changes in the total optical power of all the channels carried by fiber 10, which can cause instabilities at other nodes. When the WDM network is designed, the value of parameter d can be set according to the power spectrum distortion for that network.

Processing circuit 120 calculates $P^{j+1}_k$ using the equation described above and outputs the value of $P^{j+1}_k$ to processing circuit 120 in add-drop node 106 using feedback signal 105. Processing circuit 120 then controls the power of added channel 103, so the power is approximately equal to $P^{j+1}_k$. Therefore, crosstalk is minimized, because the channels carried in fiber 10 have an approximately equal power. The principles of this embodiment of the present invention can be employed in any of systems 100–500 described above and shown in FIGS. 1–5.

In another preferred embodiment of the present invention, processing circuit 120 calculates the average power of the channels carried by fiber 10, not including the power of added channel 103. As add/drop is performed by multiple nodes in WDM network 50 for all the channels carried by fiber 10, the power spectrum eventually becomes uniform when the power of added channel 103 is approximately equal to the average power of the channels, not including the power of added channel 103. A uniform power distribution among the channels carried by fiber 10 minimizes inter-channel crosstalk. The average power (i.e., $P^{j+1}_k$), not including the power of added channel 103, is governed by the following equation:

$$P_k^{j+1} = \frac{1}{N-1} \sum_{\substack{m=1 \\ m \neq k}}^{N} P_m^j$$

In the above equation, N is less than or equal to the total number of channels M multiplexed on fiber 10, and k is the wavelength of added channel 103.

Processing circuit 120 calculates $P^{j+1}_k$ and outputs the value of $P^{j+1}_k$ to control circuit 125 in add-drop node 106 using feedback signal 105. Control circuit 125 then controls the power of added channel 103, so the power of the added channel is approximately equal to the average power. Therefore, crosstalk is minimized, because the power spectrum of the channels carried in fiber 10 eventually becomes uniform. The principles of this embodiment of the present invention can be employed in any of systems 100–500 described above and shown in FIGS. 1–5.

In the embodiments described above, processing circuit 120 may also include intelligence for identifying weak or empty channels (i.e., channels not carrying data) multiplexed on fiber 10. For example, WDM network 50 may support unpopulated channels or a channel may become too weak for carrying data. Processing circuit 120 can identify the weak or empty channels and not include the power of the weak or empty channels for calculating the power of added channel 103. Circuitry for identifying the weak or empty channels is known in the art.

The embodiments described above and shown in FIGS. 1–5 include a dropped channel 102. Node 106 in these embodiments, however, may add a channel without dropping a channel. For example, fiber 10 may include an empty channel at $\lambda_k$. Therefore, node 106 can add a channel at $\lambda_k$ for carrying data without dropping a channel. Additionally, as discussed above, the embodiments described above and shown in FIGS. 1–5 allow local-in-span determination of power levels (i.e., a power spectrum management system can be independent of node 106) and local-in-wavelength determination of power levels (i.e., monitoring N channels in an M-channel WDM network and N can be less than or equal to M).

What has been described are the preferred embodiments of the present invention. It will be apparent, however, to those skilled in the art that it is possible to embody the invention in specific forms other than those disclosed in the preferred embodiments described above. This may be done without departing from the spirit of the invention, and the preferred embodiments are merely illustrative and should not be considered restrictive in any way. The scope of the invention is given by the appended claims, rather than the preceding description.

What is claimed is:

1. An apparatus connected to a node in an M-channel wavelength division multiplexed optical communication network, where M is equal to the number of channels operable to be multiplexed on a single fiber, said node adding one of said M channels to said fiber and said apparatus monitoring a power spectrum of N number of channels multiplexed on said fiber and controlling power of said added channel, said apparatus comprising:

a power spectrum measurement system connected to said node, said system including a power detection circuit for detecting the power of said N number of channels, and calculating power for each of said N channels and transmitting a signal operable to control the power of said added channel, and a processing circuit connected to said detection circuit, said processing circuit calculating the power of said added channel wherein the calculated power of said added channel is approximately equal to $(1-2d)P_k^j+d(P_{k-1}^j+P_{k+1}^j)$, where $P_k^j$ is the power of a channel in a span j that has the same wavelength of said added channel, said span j including a span carrying said N channels to said node, $P_{k-1}^j$ and $P_{k+1}^j$ are the powers of channels in said span j that are adjacent $P_k^j$, and d is a diffusion parameter.

2. The apparatus of claim 1, wherein said diffusion parameter d is approximately equal to a value in a range between 0 and 0.5, said range including the values of 0 and 0.5.

3. A method of monitoring and controlling a power spectrum of N number of channels in an M-channel wavelength division multiplexed optical communication network, where M is equal to the number of channels operable to be multiplexed on a single fiber and N is equal to the number of channels multiplexed on said fiber, comprising the steps of:

detecting power for each of said N channels in said network;

calculating power for each of said N channels; and controlling power of a channel added by a node in said network based on the calculated power developed by using the equation $(1-2d)P_k^j+d(P_{k-1}^j+P_{k+1}^j)$, where $P_k^j$ is the power of a channel in span j that has the same wavelength of said added channel, said span j including a span carrying said N channels to said node, $P_{k-1}^j$ and $P_{k+1}^j$ are the powers of channels in said span j that are adjacent $P_k^j$, and d is a diffusion parameter.

\* \* \* \* \*